US011364450B2

(12) United States Patent
Cordier et al.

(10) Patent No.: US 11,364,450 B2
(45) Date of Patent: Jun. 21, 2022

(54) DEVICE FOR SEPARATING A TWO-PHASE FLUID INTEGRATED INTO A GAS/LIQUID SEPARATION COLUMN

(71) Applicant: L'Air Liquide, Societe Anonyme pour l'Etude et l'Exploitation des Procedes Georges Claude, Paris (FR)

(72) Inventors: Elia Cordier, Champigny sur Marne (FR); Antony Correia, Bagneux (FR); Vincent Faucher, Champigny sur Marne (FR); Philippe Grigoletto, Champigny sur Marne (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 16/847,404

(22) Filed: Apr. 13, 2020

(65) Prior Publication Data

US 2020/0330898 A1    Oct. 22, 2020

(30) Foreign Application Priority Data

Apr. 16, 2019   (FR) .................................. FR 1904054

(51) Int. Cl.
*B01D 3/16*       (2006.01)
*B01D 3/00*       (2006.01)

(52) U.S. Cl.
CPC ............... *B01D 3/16* (2013.01); *B01D 3/008* (2013.01)

(58) Field of Classification Search
CPC . B01D 3/008; B01D 3/14; B01D 3/16; B01D 3/18; B01D 3/32

USPC .......................................... 202/262; 422/278
See application file for complete search history.

(56) References Cited

U.S. PATENT DOCUMENTS

| 2,874,798 | A |   | 2/1959  | Walker |              |
|-----------|---|---|---------|--------|--------------|
| 3,217,469 | A | * | 11/1965 | Eckert | ..... B01D 3/20 |
|           |   |   |         |        | 96/211       |
| 4,235,847 | A |   | 11/1980 | Scott  |              |
| 4,865,697 | A | * | 9/1989  | Silvey | ..... B01D 3/06 |
|           |   |   |         |        | 203/40       |

(Continued)

FOREIGN PATENT DOCUMENTS

DE           103 52 294         6/2005

OTHER PUBLICATIONS

Anonymously Disclosed, "Vapor-Liquid Separator Design," An IP.com Prior Art Database Technical Disclosure, IP.com No. IPCOM000253197D, Mar. 13, 2018, 8 pgs.

(Continued)

*Primary Examiner* — Jonathan Luke Pilcher
(74) *Attorney, Agent, or Firm* — Justin K. Murray (57) ABSTRACT

The invention relates to a gas/liquid separation column extending mainly along a vertical axis and comprising an external wall delimiting an internal space in which are arranged at least one first contact member in which the liquid and the gas are brought into contact and at least one dispensing device configured to collect the liquid resulting from the first contact member and to distribute it to a second contact member. At least one box for separating a two-phase fluid is arranged in the internal space of the column between the first contact member and the dispensing device against the wall of the column fed by a duct which passes through a wall of the separation box.

20 Claims, 4 Drawing Sheets

(56) References Cited

U.S. PATENT DOCUMENTS

5,464,573 A 11/1995 Tokerud et al.
5,580,425 A * 12/1996 Jansen ................ B01D 3/32
202/158

OTHER PUBLICATIONS

French Search Report and Written Opinion for FR 1 904 054, dated Sep. 2, 2019. (Machine Translation.).

* cited by examiner

DEVICE FOR SEPARATING A TWO-PHASE FLUID INTEGRATED INTO A GAS/LIQUID SEPARATION COLUMN

CROSS REFERENCE TO RELATED APPLICATIONS

This application claims the benefit of priority under 35 U.S.C. § 119 (a) and (b) to French patent application No. FR1904054, filed Apr. 16, 2019, the entire contents of which are incorporated herein by reference.

FIELD OF THE INVENTION

The field of the present invention relates to gas/liquid separation columns, and more particularly devices for separating a two-phase fluid that are intended to cooperate with such columns.

BACKGROUND OF THE INVENTION

Gas/liquid separation columns have been known for many years and make it possible for example to carry out a separation of various chemical elements incorporated in the composition of a fluid, for example by distillation.

For example, these columns may be enclosed in insulated chambers called cold boxes, i.e. boxes in which the temperature is maintained at extremely low temperatures, of the order of −180° C., and sometimes comprise several openings through which a liquid phase or a gas phase of the fluid containing the elements to be separated can be injected. Alternatively, the cold fluid supply ducts may be entirely contained in the cold box. Once injected into such a column, the gas phase rises to an upper part of the column whilst the liquid phase descends to a lower part of the column.

In other words, the liquid phase and the gas phase of the fluid circulate in these columns in two opposite directions. Conventionally, the liquid and gas phases of the fluid are introduced separately into the column.

These columns further comprise several contact members which bring into contact the liquid phase and the gas phase of the fluid containing the elements to be separated.

Between two successive contact members, these columns may comprise a collector which collects the liquid resulting from a first contact member to send it to a dispensing device which is itself configured to send the liquid to a second contact member and distribute it homogeneously over this second contact member.

At the same time, this collector and this dispensing device are capable of letting the gas that leaves the second contact member pass through to the first contact member.

As is for example described in document IPCOM000253197D, one or more separation devices that make it possible to separate the liquid and gas phases of a two-phase fluid may be connected to such columns in order to enable the injection of one and/or other of these liquid and gas phases through openings made at various heights of the column. As described in this document, these separation devices are conventionally housed in the cold boxes in which the columns connected to these separation devices are also housed. Thus, the two-phase fluid is separated into a liquid phase and a gas phase outside of the column before these two phases are then injected independently of one another in this column.

In order to maintain these cold boxes at the desired temperature, the walls of these boxes contain a thermally insulating material. These cold boxes are thus very expensive to produce and the manufacturers thereof therefore seek to reduce these production costs, in particular by reducing their dimensions.

The present invention falls within this context by proposing a liquid/gas separation column incorporated in which is at least one separation device which makes it possible to separate a liquid phase from a gas phase of a two-phase fluid so that the cold box containing this liquid/gas separation column and this separation device has reduced dimensions compared to the prior art.

DE10352294, U.S. Pat. Nos. 5,464,573 and 4,235,847 disclose an orifice enabling the intake of a fluid directly into a separation box. Thus, the separation of the fluid in the duct is not supported. Furthermore, the duct is not positioned so that the fluid is projected onto the external wall.

U.S. Pat. No. 2,874,798 has a straight and long duct passing through a large part of the diameter of the column. This duct comprises a plurality of expansion chambers, open at the top and bottom, enabling a liquid to fall into a tube. The liquid descends into the tube and is not projected against the external wall of the column.

SUMMARY OF THE INVENTION

One subject of the present invention thus relates to a gas/liquid separation column extending mainly along a vertical axis and comprising an external wall delimiting an internal space in which are arranged at least one first contact member in which the liquid and the gas are brought into contact and at least one dispensing device configured to collect the liquid resulting from the first contact member and to distribute it to a second contact member. At least one device for separating a two-phase fluid is arranged in the internal space of the column between the first contact member and the dispensing device. The separation device is configured to separate a liquid phase from a gas phase of a two-phase fluid.

Thus, certain embodiments of the present invention advantageously makes it possible to inject the two-phase fluid containing the elements to be separated into the column, and more precisely between the first contact member and the dispensing device without the gas and liquid phases of this two-phase fluid having to be separated beforehand.

At least one orifice for injection of the two-phase fluid is made in the external wall of the column, this injection orifice being configured to enable the injection of the two-phase fluid into the internal space of the column, between the first contact member and the dispensing device. In other words, this orifice for injection of the two-phase fluid is made opposite the separation device. The separation device comprises at least one duct arranged, at least partially, between the orifice for injection of the two-phase fluid into the internal space of the column and at least one separation box.

According to certain embodiments of the invention, this at least one separation box is configured to enable the separation of the liquid and gas phases of the two-phase fluid and is contiguous with the external wall. The at least one separation box is delimited by a peripheral wall and a vertical wall, forming a chord of the circular cross section of the column, the duct passing through the vertical wall so that an end of the duct is situated in the separation box. The at least one duct, optionally constituted by several branches, has a length such that the distance traveled by the two-phase fluid between the injection orifice and the separation box is at least equal to 80%, or even at least equal to 90%, of the diameter of the column.

The duct may be straight or otherwise L-, V- or T-shaped.

According to one advantageous configuration of the present invention, the duct extends beyond the external wall of the column, inside a cold box in which the column is received and outside of this column. In other words, according to this configuration, the duct passes through the external wall of the column through the injection orifice.

According to a particular exemplary embodiment of the present invention, the column comprises several separation devices, each arranged in the internal space of the column, between a contact member and a dispensing device.

The duct of the separation device may have a constant diameter between the orifice for injecting the two-phase fluid and the at least one separation box. This diameter may be calculated so that the circulation rate of the two-phase fluid is low enough so that a pre-separation of the liquid and gas phases takes place inside the duct, upstream of the at least one separation box. This pre-separation of the liquid and gas phases of the two-phase fluid makes it possible to reduce the dimensions of the at least one separation box, which is particularly advantageous with regard to the sizing constraints imposed by the production cost of such columns.

According to one feature of the present invention, the separation device comprises two separation boxes and the duct of this separation device has three branches among which a first branch passes through the orifice for injecting the two-phase fluid and a second branch and a third branch respectively connect the first branch to one of the separation boxes.

Advantageously, all the branches of the duct mainly lie in the same plane. For example, the second and/or third branches may partially extend into one or other of these separation boxes.

According to one feature of the invention, the column has a circular cross section, the separation boxes then being diametrically opposite.

According to the invention, at least one separation box comprises at least one hole through which the gas phase of the two-phase fluid is capable of leaving the relevant separation box and at least one aperture through which the liquid phase of the two-phase fluid is capable of leaving this separation box, the at least one hole being made in the vicinity of a first vertical end of the separation box and the aperture being made in the vicinity of a second vertical end of this separation box, opposite the first vertical end.

Advantageously, the first vertical end in the vicinity of which the at least one hole is made is an upper vertical end of the relevant separation box, that is to say an end of this separation box closest to the first contact member when this box is positioned in the column, the second vertical end in the vicinity of which the at least one aperture is made consequently being a lower vertical end of this separation box, that is to say an end of this separation box closest to the dispensing device when this box is positioned in the column.

According to one feature of the present invention, the at least one hole is made above a joining zone between the duct and the at least one separation box. Advantageously, a plurality of holes are made above this joining zone.

According to one exemplary embodiment, each of these holes has an oblong shape, a main extension axis of which is parallel to the vertical axis. According to this feature of the present invention, the two-phase fluid which arrives in the at least one separation box via the second or third branch of the duct is projected against the peripheral wall.

This projection helps in the separation of the liquid and gas phases which takes place in this at least one separation box. The two-phase fluid thus projected against this peripheral wall then separates into a liquid phase which descends to the aperture made in the vicinity of the lower vertical end of the separation box and a gas phase which rises towards the at least one hole made in the vicinity of the upper vertical end of this separation box. Alternatively, each of these holes may have a different shape, for example circular, without departing from the context of the invention.

According to one feature of the invention, the at least one separation box is delimited by a peripheral wall, a vertical wall and at least one lower horizontal wall arranged between a lower end of the vertical wall and the peripheral wall, this lower horizontal wall mainly being inscribed within a plane perpendicular to a main extension plane of the vertical wall, the at least one aperture through which the liquid phase of the two-phase fluid is capable of leaving the relevant separation box being made in this lower horizontal wall.

As above, the lower horizontal wall of a separation box corresponds to the wall of this separation box closest to the dispensing device when the separation device is positioned in the column. According to this feature of the invention, the at least one hole through which the gas phase is capable of leaving the relevant separation box is made in the vicinity of an upper end of the vertical wall. An "upper end" is understood to mean an end of this vertical wall closest to the first contact member.

Advantageously, the peripheral wall which partly delimits the at least one separation box has a semi-circular profile configured to match the shape of the external wall of the column in which the separation device is intended to be integrated.

Alternatively, this peripheral wall which delimits the at least one separation box is coincident with the external wall of the column. In other words, according to this alternative, the at least one separation box is partially delimited by the external wall of the column.

According to the invention, a pipe may be arranged in an aperture made in the lower horizontal wall of the separation box, the pipe comprising an upper vertical end which extends into the relevant separation box, the pipe being configured to be passed through by the liquid phase of the two-phase fluid.

The pipe may have a diameter substantially identical to the diameter of the aperture in which it is arranged so that the liquid phase of the two-phase fluid cannot leave the separation box without passing through these pipes.

It is also understood that the liquid penetrates into the pipe via the upper vertical end of the latter, made in the lower horizontal wall or inside the corresponding separation box.

According to one feature of the invention, the upper vertical end of each pipe is bevelled. Advantageously, this bevelled shape makes it possible to limit the fouling of these pipes and thus to fluidize the circulation of the liquid phase resulting from the relevant separation box.

For example, the oblique edge of this bevelled shape is oriented away from the peripheral wall of the relevant separation box so that at least one portion of the liquid phase must skirt around the pipe in order to be able to pass through it, which fluidizes the circulation of this liquid phase. So that the liquid phase can easily reach the pipe, a lowest point of the oblique edge of its bevelled upper vertical end is flush with the lower horizontal wall of the relevant separation box.

Preferably the at least one orifice for injecting the two-phase fluid is outside of any separation box.

Preferably the separation boxes are fed solely by the duct.

Preferably the duct opens solely into the separation box(es).

Preferably the part of the duct that is in the separation box is horizontal.

Preferably the opening of the end of the duct is facing the peripheral wall.

Preferably the duct comprises at least two, or even at least three branches perpendicular to the part of the duct directly connected to the injection orifice.

Preferably, the column comprises only a single orifice for injecting the two-phase fluid.

Preferably, the number of separation boxes is an even number.

According to certain embodiments of the invention, the separation device comprises at least one distribution member extending across the column along a transverse axis substantially perpendicular to the vertical axis. At least one pipe of the separation device comprises a lower vertical end which opens into the at least one distribution member, this distribution member being configured to distribute the liquid phase of the two-phase fluid over an entire surface of the dispensing device.

It is understood that the lower vertical end of each pipe is opposite the upper vertical end of the relevant pipe along the vertical axis. Advantageously the separation device therefore makes it possible not only to separate the liquid phase and the gas phase of the two-phase fluid but also to distribute the liquid phase homogeneously over an entire surface of the dispensing device.

According to one feature of the invention, the at least one distribution member extends between the two separation boxes. In other words, this at least one distribution member is thus fed by the liquid phases which leave each of these separation boxes. This advantageously makes it possible to overcome a possible distribution defect of one of the separation boxes. For example if one of them gets blocked, the distribution member remains fed by the liquid phase resulting from the other separation box.

At least one separation box may further be delimited by an upper horizontal wall arranged between the upper end of the vertical wall and the peripheral wall. Advantageously, this upper horizontal wall makes it possible to prevent the liquid resulting from the first contact member from penetrating into the relevant separation box and does not disrupt the phase separation that occurs in this separation box directly at the outlet of the duct of the separation device.

More advantageously still, the upper horizontal wall may extend beyond the vertical wall in the direction of the internal space of the column. This upper horizontal wall then forms an edge which prevents the liquid resulting from the first contact member from penetrating into the separation box via the holes enabling the gas phase to exit this separation box.

According to one feature of the invention, at least one separation box comprises a by-pass member firmly attached to the peripheral wall which opens into the relevant separation box, this by-pass member being configured to send the liquid phase to the at least one aperture made in the vicinity of the second vertical end of said separation box.

As mentioned above, the peripheral wall delimiting the separation box(es) may be formed by the external wall of the column, in which case the by-pass member is firmly attached to this external wall of the column. Advantageously, this by-pass member is also firmly attached to an upper portion of the end of the duct which opens into the separation box.

For example, this by-pass member may be welded to the duct of the separation device. As mentioned above, the liquid phase and the gas phase of the two-phase fluid are separated in particular owing to the projection of the two-phase fluid against the peripheral wall which partially delimits the separation box.

Thus, it may be that a fraction of the liquid phase of this two-phase fluid is projected towards the upper vertical end of the separation box. The by-pass member is then advantageously configured to divert this fraction of the liquid phase and send it to the lower horizontal wall through which it is capable of leaving this separation box.

This by-pass member thus prevents this fraction of the liquid phase from disturbing the rise of the gas phase towards the at least one hole made in the vicinity of the upper vertical end of the separation box.

According to the invention, the dispensing device comprises at least one perforated plate through which the liquid is capable of leaving the dispensing device, a plurality of stacks which emerge from this perforated plate and which are configured to be passed through by the gas present in the column, the stacks being stacked one after the other along the transverse axis perpendicular to the vertical axis, the at least one distribution member extending mainly along a direction parallel to this transverse axis passing through each stack.

The at least one distribution member comprises a plurality of notches through which the liquid phase is capable of reaching the dispensing device, these notches being made between the stacks of the dispensing device.

Advantageously these notches are made laterally to the distribution member and are configured to enable the liquid phase to reach the dispensing device by overflowing.

In other words, the liquid phase accumulates in the distribution member until a level of this accumulated liquid phase reaches one of the lateral notches and this liquid phase can then overflow via this lateral notch.

According to one exemplary embodiment of the present invention, at least one notch is made between two successive stacks. According to another exemplary embodiment of the present invention, several notches may be made between two successive stacks.

According to one aspect of the present invention, all the notches have vertical dimensions that are equivalent, or substantially equivalent. Alternatively, these notches may have different vertical dimensions calculated so that the liquid phase of the two-phase fluid is distributed homogeneously over an entire surface of the dispensing device.

According to one exemplary embodiment of the present invention, the separation device comprises two distribution members, these two distribution members extending along two mutually parallel directions.

It is then understood that the pipes via which the liquid phases leave the separation boxes open into one or the other of these distribution members. Advantageously, each separation box comprises at least two pipes, each of these pipes opening into one or the other of the distribution members.

Certain embodiments of the present invention also relates to a distillation assembly which comprises at least one gas/liquid separation column according to the invention, this column being enclosed in a cold box.

One subject of the present invention thus relates to a separation process, for example a distillation process, using a gas/liquid separation column extending mainly along a vertical axis and comprising an external wall delimiting an internal space in which are arranged at least one first contact member in which the liquid and the gas are brought into contact, the liquid resulting from the first contact member is collected with at least one dispensing device which is also used to distribute the liquid to a second contact member and a two-phase fluid, originating from a source outside of the column, is sent into the internal space of the column between the first contact member and the dispensing device through an orifice for injecting the two-phase fluid, made in the external wall of the column and is separated therein using at least one device for separating a two-phase fluid which is arranged therein, the separation device comprising at least one duct arranged, at least partially, between the orifice for injecting the two-phase fluid into the internal space of the column and at least one separation box contiguous with the external wall, the separation of the liquid and gas phases of the two-phase fluid taking place at least in the at least one separation box.

Preferably, the two-phase fluid is separated into two phases firstly in the duct and then in the at least one separation box.

According to other features of the process, the column may have at least one of the features described above.

The source of two-phase fluid may be a duct. Preferably, the source of two-phase fluid does not comprise any phase separator.

Alternatively, the source of two-phase fluid may comprise a phase separator. Obviously, the dimensions of this phase separator will be reduced compared to that which a phase separator would have without phase separation means in the internal space.

The internal space is preferably devoid of any tray and/or packing for facilitating the separation of a two-phase fluid.

A "cold box" is understood to mean a box in which the temperature is maintained at around −180° C. By integrating the separation device directly into the internal space of the column it is understood that the present invention advantageously makes it possible to reduce the dimensions of this cold box, and therefore to reduce its production cost.

BRIEF DESCRIPTION OF THE DRAWINGS

Further features and advantages of the invention will become apparent from the description hereinafter of embodiments, which are given by way of illustration but without any limitation, the description being given in relation with the following attached figures.

DETAILED DESCRIPTION OF THE INVENTION

Figure 1:
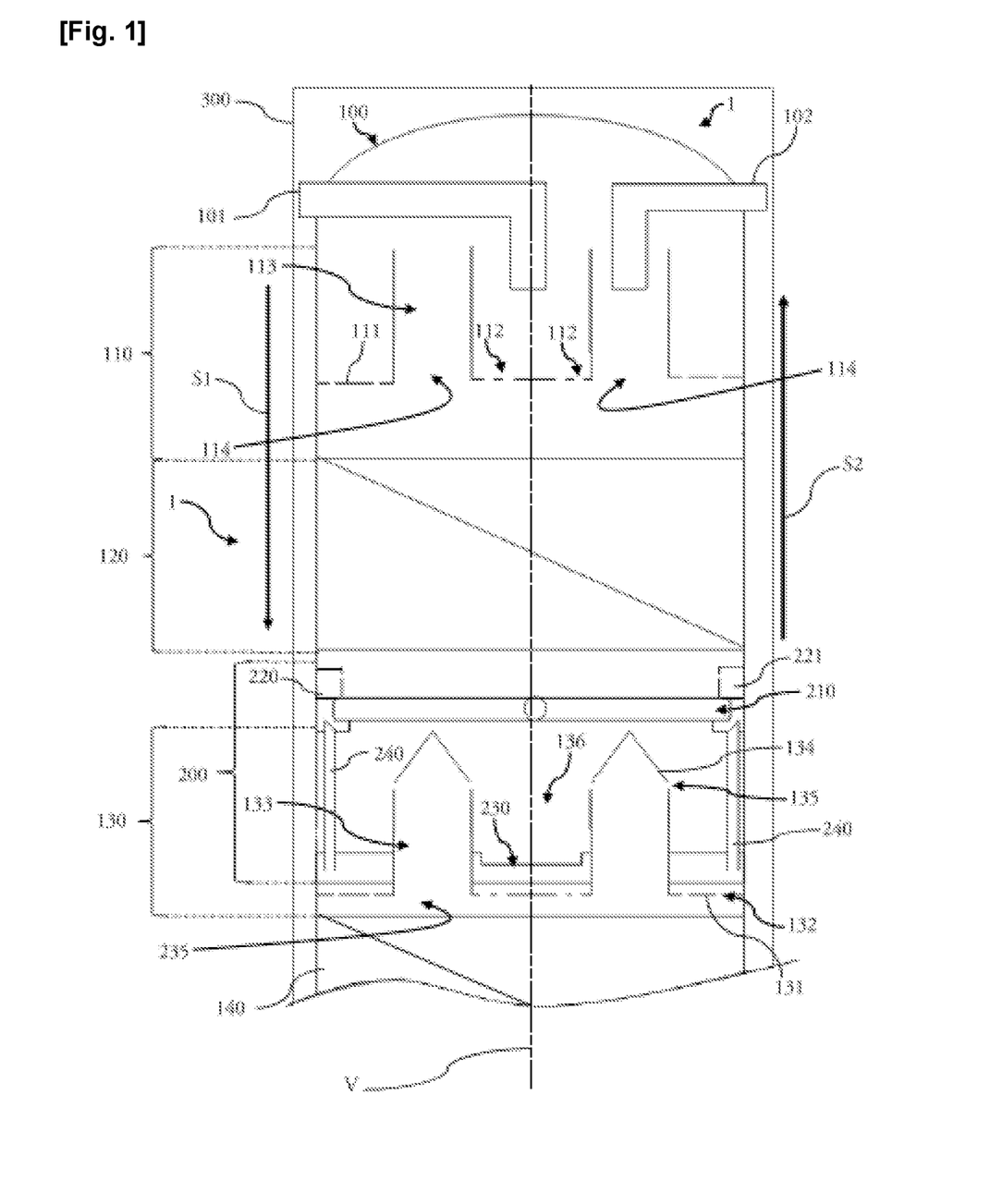
FIG. 1 schematically illustrates an upper part of a gas/liquid separation column according to the present invention integrated into which is a device for separating a liquid phase and a gas phase of a two-phase fluid, this column being enclosed in a cold box, this FIG. 1 in particular making visible two contact members positioned between which is a dispensing device, the separation device being arranged between a first contact member and the dispensing device.

Represented schematically in FIG. 1 is an upper part of a gas/liquid separation column 1 according to the present invention. This column 1 extends mainly along a vertical axis V and may for example have a circular cross section.

Such a column 1 comprises an external wall 100 in which are made at least one liquid inlet 101 and one gas inlet—not illustrated here—and also one liquid outlet—not represented here—and one gas outlet 102.

According to one example illustrated here, the liquid inlet 101 and the gas outlet 102 take the form of pipes. The external wall 100 delimits an internal space of the column 1 in which a liquid phase and a gas phase of a homogeneous fluid circulate, the constituent elements of which homogeneous fluid it is desired to separate.

The liquid phase circulates in the internal space of the column 1 along a downward first flow direction S1 and the gas phase itself circulates in the internal space of the column 1 along an upward second flow direction S2, opposite the first direction S1. It is therefore understood that a liquid outlet and a gas inlet are arranged in a lower portion of the column 1 not illustrated here.

In the remainder of the description the terms "upstream", "downstream", "above", "below", "inlet", "outlet", "upper" and "lower", refer to the downward first flow direction S1 of the liquid phase in the internal space of the column 1. In the remainder of the description the terms "liquid phase" and "liquid" and the terms "gas phase" and "gas" are used without distinction.

Thus, the internal space of the column 1 comprises, in this order along the first flow direction S1 of the liquid through the column 1, a first dispensing device 110 configured to collect the liquid which enters the column 1 via the liquid inlet 101 and to distribute it over an entire surface, here an upper surface, of a first contact member 120. The liquid which emerges from this first contact member 120 is then collected by a second dispensing device 130.

This second device 130 is then configured to distribute the collected liquid over an entire surface of a second contact member 140, this second contact member 140 being only partially represented in FIG. 1. As represented, the column 1 according to the invention is enclosed in a cold box 300, i.e. a box in which the temperature is maintained at a very low temperature. A wall of this cold box 300 thus comprises a thermally insulating material in order to enable the maintenance of this very low temperature.

Each of the dispensing devices 110, 130 of the column 1 comprises at least one perforated plate 111, 131, i.e. a plate in which orifices 112, 132 are made, through which orifices the liquid is capable of leaving the relevant dispensing device 110, 130. As illustrated, stacks 113, 133 emerge from this plate 111, 131 and extend parallel to the vertical axis V when the dispensing device is positioned in the separation column 1. According to the invention, these stacks 113, 133 are configured to be passed through by the gas along the second flow direction S2.

For this purpose, the plates 111, 131 of these dispensing devices 110, 130 each comprise a plurality of cutouts 114, 235, arranged opposite each of these stacks 133. In other words, each plate 111, 131 comprises as many cutouts 114, 235 as the relevant dispensing device 110, 130 comprises stacks 113, 133.

The second dispensing device 130 differs from the first dispensing device 110, notably by the presence of closure means 134 arranged on each stack 133, at an upper end thereof. These closure means 134 are advantageously configured to prevent the liquid which leaves the first contact member 120 from being introduced into the stacks 133 of the second dispensing device 130 and from disturbing the rise of gas through these stacks 133.

Openings 135 are made between each closure means 134 and the stack 133 on which it is arranged so as to enable the gas circulating in these stacks 133 to leave this second dispensing device 130 in order to reach the first contact member 120. For example, these openings 135 may be made by holes drilled in an upper region of each stack 133, under the corresponding closure means 134.

As illustrated in FIG. 1, each of these closure means 134 comprises two inclined walls so that these closure means 134 take the form of pyramids that are open at their bases. It is understood that the liquid which falls on the inclined walls of these closure means 134 is thus deflected so that it cannot reach the stacks 133. It is furthermore observed that two successive stacks 133 together delimit a trough 136 configured to collect the liquid resulting from the first contact member 120. As illustrated, the lower vertical end of these troughs 136 is formed by a portion of the perforated plate 131.

Advantageously, the orifices 132 through which the liquid is capable of leaving the second dispensing device 130 are thus made in the portions of the perforated plate 131 forming the bottoms of these troughs 136. It is then understood that the inclined walls of the closure means 134 are inclined in the direction of these troughs 136, so that the liquid which arrives on these closure means 134 is deflected towards these troughs 136 and therefore towards the orifices 132. It should be understood that FIG. 1 is schematic and that the second dispensing device 130 may comprise, depending on its size and for example its diameter, a plurality of stacks 133 and also a plurality of troughs 136.

Advantageously, the second dispensing device 130 has a disc shape sized to be perfectly compatible with the circular cross section of the column 1.

The troughs 136 and the stacks 133 are arranged in series, parallel to one another and alternately, so as to extend over the entire surface of the disc.

According to the invention, the column 1 comprises a separation device 200 arranged in the internal space of the column 1. This separation device 200 is advantageously positioned between the first contact member 120 and the second dispensing device 130. In order to enable the introduction of the two-phase fluid into the internal space of the column 1, at least one orifice 103 for injecting this fluid is made in the external wall 100 of this column 1, downstream of the first contact member 120. This injection orifice 103 is for example represented in FIG. 2.

In other words, this injection orifice is made between the first contact member 120 and the second dispensing device 130. The fluid is injected into the internal space of the column 1 in two-phase form, i.e. the injected fluid comprises a gas phase and a liquid phase.

As mentioned above, the liquid and the gas circulate in the internal space of the column 1 along two opposite directions. It is therefore understood that for the column 1 to function in an optimal manner, it is advisable to separate the liquid phase and the gas phase of the two-phase fluid injected through the abovementioned injection orifice 103. This separation of the phases must be carried out at very low temperature, i.e. a temperature of the order of the temperature maintained in the cold box 300.

As illustrated, the separation device 200 is thus positioned opposite the injection orifice through which the two-phase fluid is injected into the column 1. Advantageously, this separation device 200 is not very bulky in comparison with the other components present in the internal space of the column 1 so that its insertion into this column can be achieved without the height of this column 1 being significantly increased.

This separation device 200 comprises a duct 210 which extends at least between the injection orifice 103 made in the external wall 100 of the column 1 and at least one separation box 220, 221, in which the liquid phase and the gas phase of the two-phase fluid are separated. According to the example illustrated here, the separation device 200 comprises two diametrically opposite separation boxes 220, 221.

It is also conceivable that the duct 210 does not divide but extends across the column in a straight line in order to arrive at a single separation box, diametrically opposite the injection orifice. Another possibility for the case with a single separation box would be to have an L-shaped or V-shaped duct 210.

The separation device 200 further comprises at least one liquid distribution member 230 configured to distribute the liquid phase of the two-phase fluid over an entire surface of the second dispensing device 130. It is also observed in FIG. 1 that at least one pipe 240 connects each separation box 220, 221 to the distribution member 230. Each of these pipes 240 is configured to convey the liquid phase of the two-phase fluid from the separation box 220, 221 in which it has been separated to the distribution member 230.

In other words, this distribution member 230 is fed simultaneously with liquid by the two separation boxes 220, 221. According to the exemplary embodiment represented in FIGS. 2 and 3, the separation device 200 advantageously comprises two liquid distribution members 230, each of these distribution members 230 advantageously being fed with liquid by each of the separation boxes 220, 221.

Figure 2:
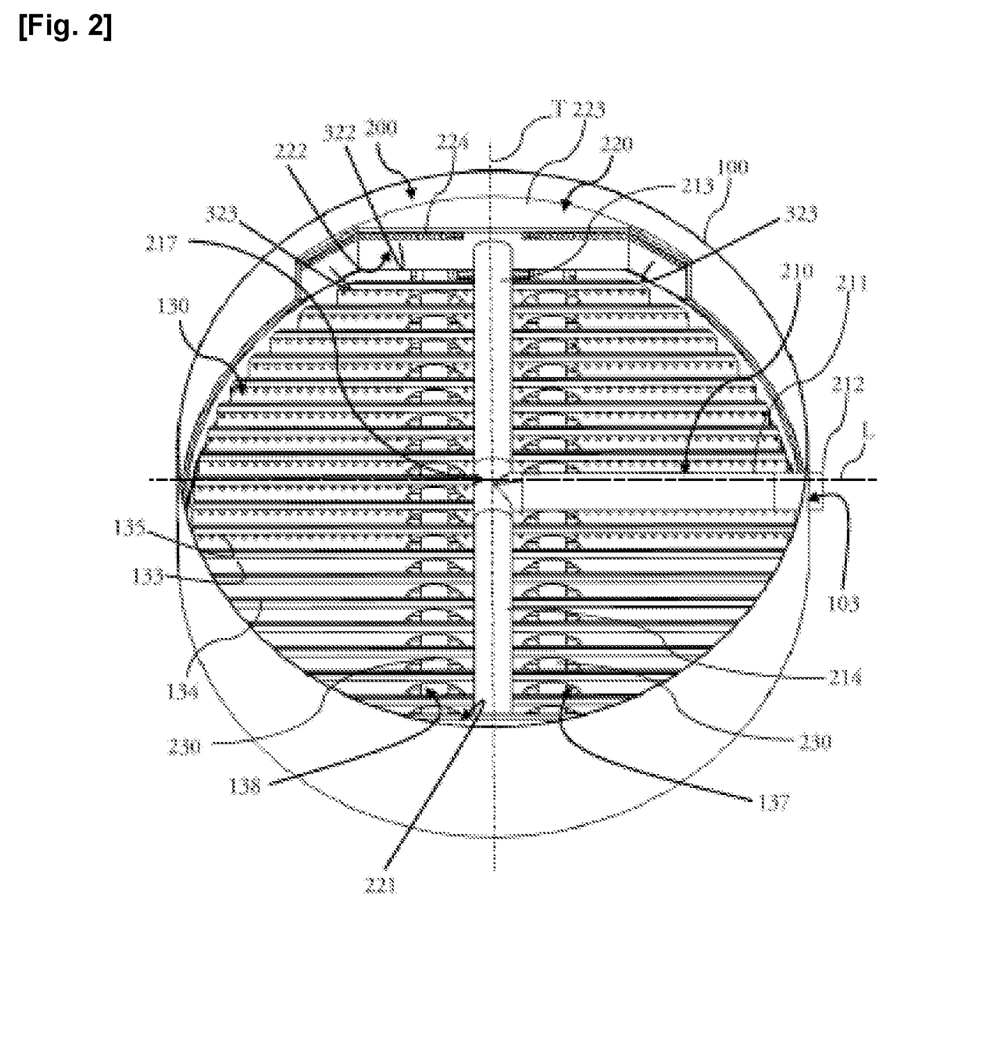
FIG. 2 is a top perspective view of a portion of the gas/liquid separation column partially illustrated in FIG. 1, this portion of the column comprising the separation device and a device for dispensing a liquid.
Figure 3:
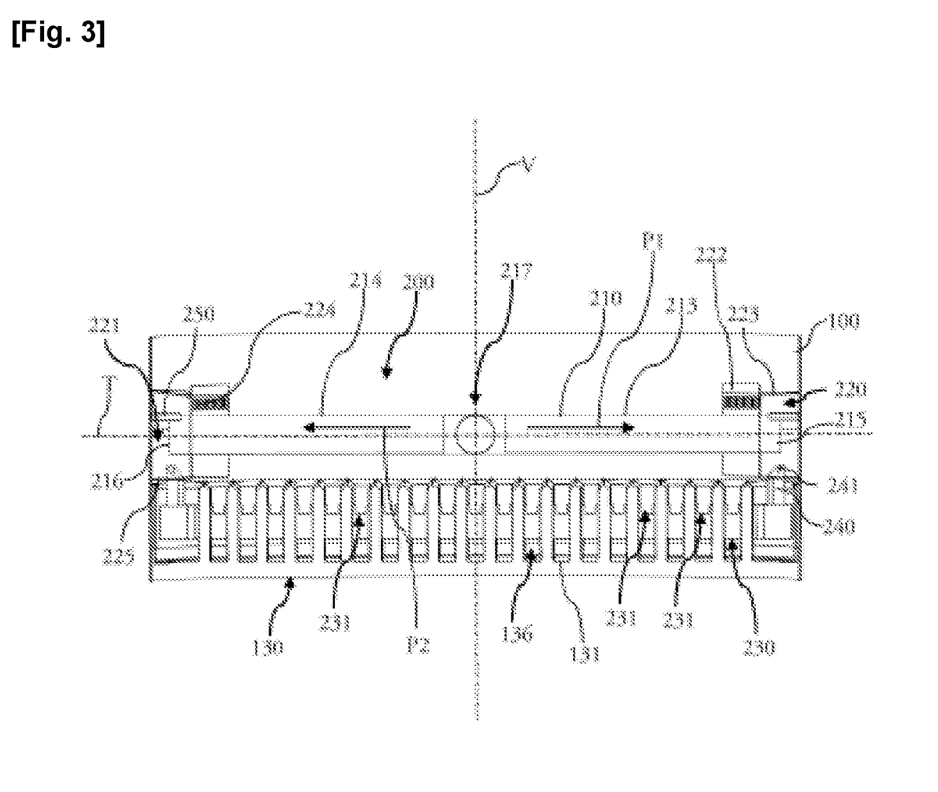
FIG. 3 is a cross-sectional view of the portion of the column illustrated in FIG. 2, this cross section being taken along a vertical and transverse plane.

With reference to FIGS. 2 and 3, the arrangement and the operation of the separation device 200 arranged in the internal space of the column 1 will now be described in greater detail.

FIG. 2 is a top perspective view of a portion of the column comprising the separation device 200 and the second dispensing device 130.

It is observed in particular from this FIG. 2 that the stacks 133 of the second dispensing device 130 are arranged one after the other along a transverse axis T perpendicular to the vertical axis. It is also observed that each stack 133 extends mainly along a longitudinal axis L perpendicular to the transverse axis T and to the vertical axis and that each closure means 134 extends over an entire longitudinal dimension of the stack 133 on which it is arranged. This FIG. 2 also particularly makes visible the openings 135 through which the gas which passes through these stacks 133 leaves the second dispensing device 130.

To facilitate the understanding of FIG. 2, these openings 135 are represented on a portion of the stacks 133 only but it is understood that in fact openings 135 are made in each stack 133.

As mentioned above, this separation device 200 comprises in particular a duct 210 and two separation boxes 220, 221. This duct 210 comprises at least a first intake branch through which the two-phase fluid is capable of reaching the separation device 200, a second feed branch which connects the first intake branch to one of the separation boxes 220, and a third feed branch which connects the first intake branch to the other separation box 221. In the example illustrated here, the separation boxes 220, 221 are diametrically opposite and the duct 210 has a T shape.

In other words, the duct 210 comprises a first branch 211 of which a first end 212 extends outside of the column, a second branch 213 of which a second end extends into a first separation box 220 and a third branch 214 of which a third end extends into a second separation box 221. The second end and the third end extending respectively into the first separation box 220 and into the second separation box 221, and they are not visible in this FIG. 2. As illustrated, the first end 212 passes through the external wall 100 of the column via the injection orifice 103 mentioned above.

The at least one duct 210 constituted by several branches 211, 212, 213, has a length such that the distance traveled by the two-phase fluid between the injection orifice and the separation box is at least equal to 80%, or even at least equal to 90%, of the diameter of the column. This distance traveled favours the stabilization of the flow before entering the separation box.

On arriving in the separation box(es), the fluid of the duct is projected against the wall of the column, which promotes the separation of the phases.

The separation box(es) are provided contiguously with the wall in order to hamper as little as possible the passage of gas in the column and thus enable the distillation to be carried out under good conditions.

Advantageously, the fact that this first end 212 extends beyond the external wall 100 of the column makes it possible to facilitate the connection of this duct 210 to a feed device—not illustrated here—configured to feed the separation device 200 with two-phase fluid. It is therefore understood that the two-phase fluid is injected into the duct 210 through its first end 212, then that it travels to each of the separation boxes 220, 221 that it reaches by means of the second and third branches 213, 214 of this duct 210.

According to the example illustrated here, the duct 210 has a constant diameter over its entire dimension, so as to avoid the creation of disturbances in the flow of the fluid from the inlet of the duct 210 to the separation boxes 220, 221. Advantageously, this diameter is calculated so that the two-phase fluid circulates therein at a low enough speed so that a pre-separation of the liquid and gas phases takes place upstream of the separation boxes 220, 221. A "pre-separation" is understood to mean that, already in the duct 210, the gas phase of the two-phase fluid has a tendency to rise whilst the liquid phase itself has a tendency to descend.

Thus, the separation of the phases which subsequently takes place in the separation boxes 220, 221 is facilitated, which makes it possible to reduce the size of these separation boxes 220, 221 and consequently to reduce the production costs of a column according to the invention.

The separation boxes 220, 221 are advantageously diametrically opposite along the transverse axis T. According to the example illustrated here, these separation boxes 220, 221 are symmetrical relative to a median vertical plane, i.e. a plane in which the vertical axis and a longitudinal diameter of the column are inscribed, so that the description which is given for one of these separation boxes is also valid for the other of these separation boxes.

As mentioned above, the separation device 200 also comprises two distribution members 230 which extend along two parallel directions. As represented, these directions are also parallel to the transverse axis T so that these distribution members 230 extend from the first separation box 220 to the second separation box 221 passing through each of the stacks 133 of the second dispensing device 130.

In other words, each stack 133 has a first through-recess 137 and a second through-recess 138, through which one or the other of the distribution members 230 passes.

Advantageously the first recesses 137 of two successive stacks 133 along the transverse axis T are aligned parallel to this transverse axis T. In the same way, the second recesses 138 of two successive stacks along the transverse axis T are aligned parallel to this transverse axis T.

In other words, all the first recesses 137 are aligned together along an axis parallel to the transverse axis T and all the second recesses 138 are aligned together along another axis, also parallel to the transverse axis T. It is understood that the first and second recesses 137, 138 made in the stacks 133 are leaktight so that the liquid which flows in one or the other of the distribution members 230 cannot enter these stacks 133. The two distribution members 230 are identical and the description given below of one can be directly transposed to the other.

As illustrated in this FIG. 2, it is observed that each separation box 220, 221 is delimited at least by a peripheral wall, by a vertical wall 222, i.e. a wall that extends mainly in a plane in which the vertical axis and the longitudinal axis L are inscribed, and by an upper horizontal wall 223, i.e. a wall that extends mainly in a horizontal plane, i.e. a plane perpendicular to the vertical wall 222 and in which the transverse axis T and the longitudinal axis L are inscribed.

More particularly, the vertical wall 222 comprises a main part 322 intended to be passed through by the second or third branch 213, 214 of the duct 210 and two lateral parts 323. As represented in FIG. 2, this main part 322 and the two lateral parts 323 extend in three different and mutually secant vertical planes. As illustrated, these vertical planes are arranged so as to follow a curvature of the peripheral wall of the relevant separation box 220, 221.

According to the example illustrated in the figures, the peripheral wall which helps to delimit each separation box 220, 221 is made by the external wall of the column. Alternatively, this peripheral wall could be separate from the external wall of the column on condition that it then has a curved shape having a semi-circular profile with a shape complementary to the shape of the circular cross section of the external wall of the column so that the separation device perfectly matches the shape of this column. The upper horizontal wall 223 is referred to as "upper" in the sense that it is the wall of this separation box 220, 221 closest to the first contact member when the separation device 200 is positioned in the column. Thus, this upper horizontal wall 223 extends between an upper end of the vertical wall 222 and the peripheral wall of the relevant separation box 220, 221.

Advantageously, this upper horizontal wall 223 makes it possible to prevent the liquid which descends from the first contact member of the column from penetrating into the relevant separation box 220, 221 and disturbing the separation of the two-phase fluid which takes place in said separation box 220, 221.

It is also observed that a plurality of holes 224 are made in the vertical wall 222 and more precisely in the vicinity of the upper end of this vertical wall 222. As represented, these holes 224 are uniformly distributed over the main part 322 and over the lateral parts 323 of this vertical wall 222.

As will be described more fully below, these holes 224 are configured to enable the gas phase of the two-phase fluid to leave the relevant separation box 220, 221.

These holes 224 are advantageously made above the end of the duct 210 which opens into the relevant separation box 220, 221, i.e. above a joining zone between the duct and the relevant separation box.

In other words, when the separation device 200 is positioned in the column 1, a distance measured parallel to the vertical axis V between one of these holes 224 and the first contact member is smaller than a distance measured parallel to the vertical axis V between the duct 210 and this first contact member.

It is also understood that this vertical wall 222, and more precisely, the main part 322 of this vertical wall 222, comprises a cutout through which the duct 210, and more exactly the second end of the second branch 213 or the third end of the third branch 214 of this duct 210, may be introduced into this separation box 220.

With reference to FIG. 3, the operation of the separation device 200 will now be described more fully. This FIG. 3 is a cross section of the portion of the column illustrated in FIG. 2, this cross section being made along a vertical and transverse plane, i.e. a plane in which the vertical axis V and the transverse axis T are inscribed.

As mentioned above, the two-phase fluid reaches the duct 210 via its first end—not visible in FIG. 3—then travels through the first branch to a bifurcation 217 at which a first portion P1 of the two-phase fluid is sent to the second end 215 of the second branch 213 and a second portion P2 of this two-phase fluid is itself sent to the third end 216 of the third branch 214 of this duct 210.

As illustrated, the second end 215 opens into the first separation box 220 and the third end 216 itself opens into the second separation box 221. As described above, the first separation box 220 and the second separation box 221 are symmetrical and the description which is given below of one extends to the other. In the same way, the references indicated for one of these separation boxes 220, 221 can be transposed to the other.

It is firstly observed that, besides the peripheral wall, the vertical wall 222 and the upper horizontal wall 223, each separation box 220, 221 is delimited by a lower horizontal wall 225.

This horizontal wall 225 is referred to as "lower" in the sense that it is the wall closest to the second dispensing device 130 when the separation device 200 is positioned in the column. Thus, this lower horizontal wall 225 extends in a plane perpendicular to the main extension plane of the vertical wall 222, and more particularly in a plane perpendicular to the main extension plane of the main part 322 of this vertical wall 222, from a lower end of this vertical wall 222 to the peripheral wall.

As mentioned above, the two-phase fluid arrives in the separation boxes 220, 221 in a form already partially separated. Advantageously, the second and third ends 212, 213 of the duct 210 each open at a relatively small distance from the peripheral wall so that the two-phase fluid which exits this duct 210 is at least partially projected against this peripheral wall. Once projected against the peripheral wall of the relevant separation box 220, 221, the gas phase of the two-phase fluid rises towards the upper horizontal wall 223 whilst the liquid phase descends towards the lower horizontal wall 225.

As mentioned above, the gas phase then leaves the separation box through the holes 224 made in the vertical wall 222 in order to reach the first contact member described above.

At least one aperture is furthermore made in the lower horizontal wall 225, this aperture being configured to enable the passage of the pipe 240 through which the liquid phase is capable of reaching one of the distribution members 230. According to the example illustrated here, each pipe 240 extends mainly along a direction parallel to the vertical axis V. As represented, this pipe 240 thus comprises an upper vertical end 241 which extends into the relevant separation box 220, 221 and a lower vertical end—not visible in the figures—which itself opens into one of the distribution members 230.

In the example illustrated, the upper vertical end 241 of the pipe 240 has a bevelled shape. Advantageously, the oblique edge of this bevelled shape is turned away from the peripheral wall, so that the liquid phase, pouring from the duct, which falls mainly between this upper vertical end 241 of the pipe 240 and the peripheral wall, must skirt around this pipe 240 in order to be able to pass through it.

Advantageously, this makes it possible to fluidize the circulation of this liquid phase and to slow down the fouling of this pipe 240 in order to maximize the efficiency of the relevant separation box 220, 221. In order to further facilitate the flow of the liquid phase in this pipe 240, it is observed that the lowest point of this oblique edge is flush with the lower horizontal wall 225.

As described above, each distribution member 230 extends parallel to the transverse axis T between the first separation box 220 and the second separation box 221 so that this distribution member 230 is fed by the liquid phases resulting from each of these separation boxes 220, 221.

Advantageously, this configuration makes it possible to overcome a possible failure of one or other of these separation boxes 220, 221. Specifically, it is understood that even if one of these separation boxes no longer feeds the distribution member for any reason, this distribution member remains fed by the other separation box.

As described above, the separation device 200 according to the invention comprises two identical distribution members 230. It is therefore understood that at least two apertures are made in each lower horizontal wall 225 of each separation box 220, 221, each of these apertures being configured to allow the passage of a pipe 240.

Thus, at least two pipes 240 open into each separation box 220, 221, each of these pipes 240 reaching one of the distribution members 230. In other words, each distribution member 230 is fed by the liquid phases from each of the separation boxes 220, 221.

Each distribution member 230 is configured to distribute the liquid phase of the two-phase fluid over an entire surface of the second dispensing device 130. More precisely, it is understood that this liquid phase must be distributed into each of the troughs 136 of this second dispensing device 130 in order to be able to leave the latter via the orifices made in the bottom walls of these troughs 136. For this purpose, each distribution member 230 comprises a plurality of notches 231 made between the stacks 133 of the second dispensing device 10. It is observed that these notches 231 are made laterally to this distribution member 230.

In this way, these notches 231 are made in portions of the distribution member 230 arranged in the troughs 136. These notches 231 enable a distribution of the liquid by overflowing.

In other words, the liquid accumulates in the distribution member 230 until a level of this accumulated liquid exceeds one of the lateral notches 231 of this distribution member 230. The liquid can thus overflow from this distribution member 230 to reach the dispensing device 130.

According to the example illustrated here, these notches 231 all have substantially equivalent dimensions.

According to another example not represented here, these notches are deeper or shallower depending on their position.

In other words, the closer the notch is to the centre of the dispensing device, the larger a vertical dimension of this notch is, so as to ensure a perfectly homogeneous distribution of the liquid phase over the entire surface of the dispensing device.

As described above, the second and third ends 212, 213 of the duct 210 each open at a relatively small distance from the peripheral wall so that the two-phase fluid which exits this duct 210 is at least partially projected against this peripheral wall.

In order to prevent, owing to this projection, the liquid phase from being deflected towards the upper horizontal wall 223 and disturbing the circulation of the gas phase, a by-pass member 250 is advantageously positioned between the second or third end 215, 216 of the duct 210 and the peripheral wall. Thus, each separation box 220, 221 comprises a by-pass member 250 firmly attached to the relevant end of the duct 210, and more particularly of an upper portion of this end.

As represented, these by-pass members 250 extend to the peripheral wall. For example, these by-pass members 250 may be welded to the duct 210. They respectively have a longitudinal dimension substantially equivalent to an external diameter of the duct 210 so that the gas phase can skirt round this by-pass member to reach the holes 224 made in the vertical wall 222.

It is finally observed that, according to the example illustrated in FIG. 3, the upper horizontal wall 223 of each separation box 220, 221 is inclined so as to form a downward ramp towards the centre of the column, so that this upper horizontal wall 223 makes it possible not only to prevent the liquid already present in the column from reaching the relevant separation box 220, 221 but also to send the liquid which falls on this upper horizontal wall 223 to the second dispensing device 130.

According to one example not illustrated here, this upper horizontal wall may also extend beyond the vertical wall in the direction of the internal space so that it forms an edge which prevents the liquid that descends from the first contact member from reaching the relevant separation box via the holes made in this vertical wall and that are intended to be passed through by the gas phase.

The present invention thus proposes a gas/liquid separation column in which a two-phase fluid can be injected without its various phases having to be separated upstream. Advantageously, this makes it possible to reduce the dimensions of the cold box in which this column is conventionally enclosed with an external separation device, and thus to reduce the production costs of such a cold box.

However, the present invention is not limited to the means and configurations described and illustrated here and it also extends to any equivalent means and any equivalent configuration and to any technically effective combination of such means.

In particular, the shape, the number and the positioning of the separation boxes of the separation device may be modified without detrimentally affecting the invention in so far as these separation boxes fulfil the functionalities described in the present document.

Figure 4:
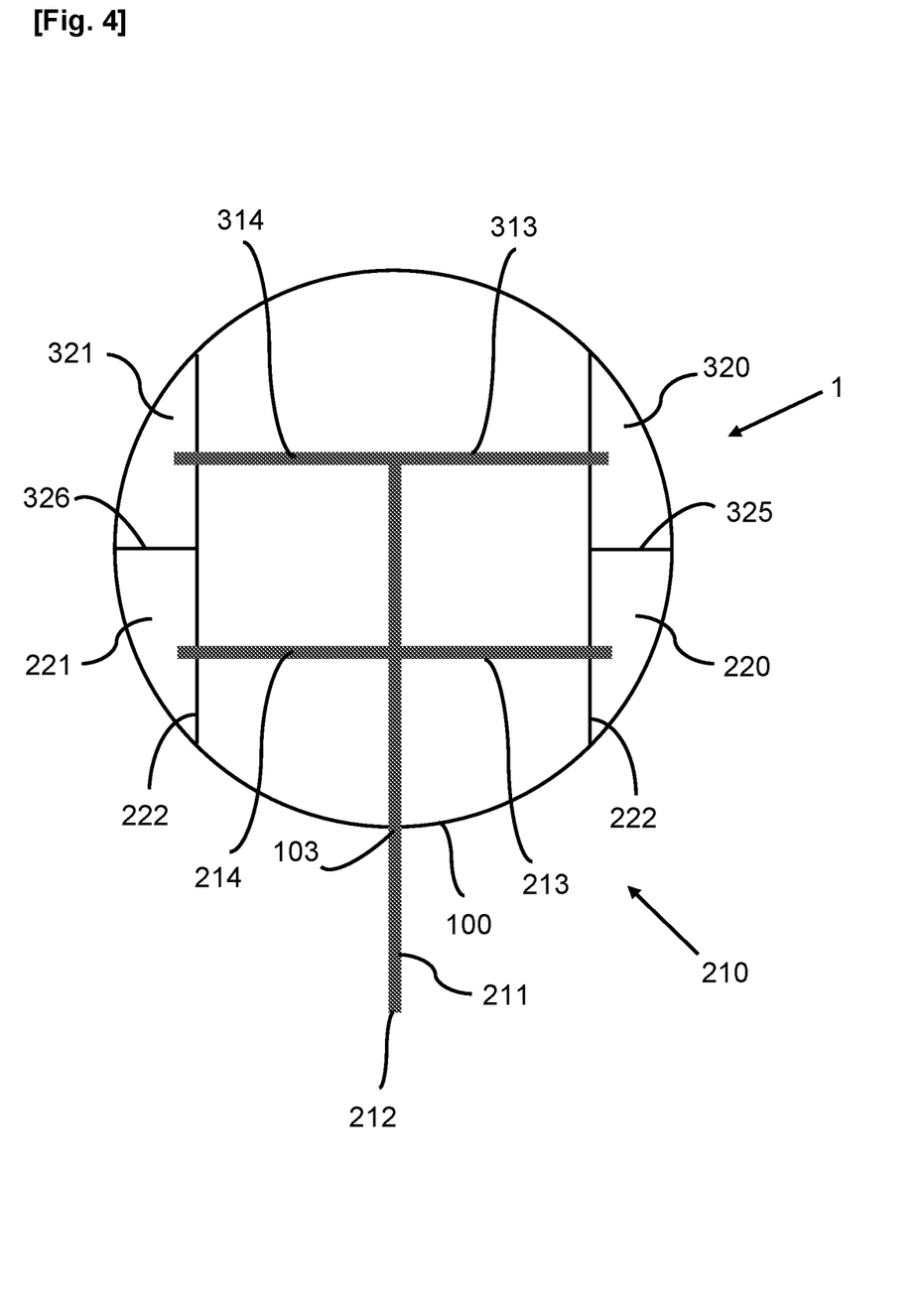
FIG. 4 provides another view of an embodiment of the invention.

For example, as illustrated in FIG. 4, four separation boxes may be used. Here, the separation boxes are delimited by a peripheral wall, the vertical wall 222 following a chord of the cross section of the column from FIG. 2, i.e. a wall which extends mainly in a plane in which the vertical axis and the longitudinal axis L are inscribed, and by an upper horizontal wall 223, i.e. a wall that extends mainly in a horizontal plane, i.e. a plane perpendicular to the vertical wall 222 and in which the transverse axis T and the longitudinal axis L are inscribed. The four boxes 220, 221, 320, 321 are formed by placing a vertical wall 325, 326 in the middle of the space.

As mentioned above, the two-phase fluid reaches the duct 210 via its first end 212 via the opening 103 then travels through the first branch to a first bifurcation at which a first portion P1 of the two-phase fluid is sent to the second end 215 of the second branch 213 and a second portion P2 of this two-phase fluid is itself sent to the third end 216 of the third branch 214 of this duct 210.

As illustrated, the second end 215 opens into the first separation box 220 and the third end 216 itself opens into the second separation box 221. As described above, the first separation box 220 and the second separation box 221 are symmetrical and the description which is given below of one extends to the other. In the same way, the references indicated for one of these separation boxes 220, 221 can be transposed to the other.

A third portion P3 of the two-phase fluid continues into the first branch and arrives at a second bifurcation where all the remaining fluid is sent either into the third branch 313 or into the fourth branch 314. The third branch arrives in the third box 321 and the fourth branch in the fourth box 320.

Once projected against the peripheral wall of the relevant separation box 220, 221, 320, 321, the gas phase of the two-phase fluid rises towards the upper horizontal wall 223 whilst the liquid phase descends towards the lower horizontal wall 225.

As mentioned above, the gas phase then leaves the separation box through the holes 224 made in the vertical wall 222 in order to reach the first contact member described above.

The invention claimed is:

1. A gas/liquid separation column extending mainly along a vertical axis and comprising:
   a cylindrical external wall delimiting an internal space in which is arranged a first contact member in which liquid and gas are brought into contact;
   a dispensing device configured to collect a liquid resulting from the first contact member and to distribute the liquid to a second contact member;
   a separation device configured to separate a two-phase fluid arranged in the internal space of the column between the first contact member and the dispensing device; and
   an orifice for injecting the two-phase fluid being made in the external wall of the column, this injection orifice being configured to enable the injection of the two-phase fluid into the internal space of the column, between the first contact member and the dispensing device,
   wherein the separation device comprises a first separation box, a second separation box, and a duct that is arranged, at least partially, between the orifice for injecting the two-phase fluid into the internal space of the column, wherein each of the first and second separation boxes is configured to separate liquid and gaseous phases of the two-phase fluid and are each contiguous with the external wall;
   wherein the duct has a length such that a distance travelled by the two-phase fluid between the injection orifice and each of the first and second separation boxes is at least equal to 80% of the diameter of the column,
   wherein each of the first and second separation boxes is delimited by a peripheral wall and a vertical wall, with the vertical wall forming a chord of the circular cross section of the gas/liquid separation column, the duct passing through the vertical wall so that an end of the duct is situated in each of the first and the second separation boxes,
   wherein the first separation box is diametrically opposite the second separation box.

2. The gas/liquid separation column according to claim 1, in which the duct of the separation device has a constant diameter between the injection orifice and each of the first and second separation boxes.

3. The gas/liquid separation column according to claim 1, wherein the duct of the separation device has at least three branches comprising a first branch, a second branch, and a third branch, wherein the first branch passes through the injection orifice, wherein the second branch connects the first separation box to the first branch, and wherein the third branch connects the second separation box to the first branch.

4. The gas/liquid separation column according to claim 1, further comprising a first distribution member extending between the first separation box and the second separation box.

5. The gas/liquid separation column according to claim 1, in which the first separation box comprises a first hole through which the gaseous phase of the two-phase fluid is capable of leaving the first separation box and a first aperture through which the liquid phase of the two-phase fluid is capable of leaving first separation box, the first aperture being made in the vicinity of a lower vertical end of the first separation box and the first hole being made in the vicinity of an upper vertical end of the first separation box, opposite the lower vertical end.

6. The gas/liquid separation column according to claim 5, in which the first hole is made above a joining zone between the duct and each of the first and second separation boxes.

7. The gas/liquid separation column according to claim 5, in which each of the first and second separation boxes is delimited by the peripheral wall, the vertical wall and a lower horizontal wall arranged between a lower end of the vertical wall and the peripheral wall, the lower horizontal wall being substantially perpendicular to the vertical wall, wherein the peripheral wall has a semi-circular profile.

8. The gas/liquid separation column according to claim 7, in which a first pipe is arranged in a first aperture made in the lower horizontal wall of the first separation box, the first pipe comprising an upper vertical end, which extends into the first separation box, and the first pipe being configured to be passed through by the liquid phase of the two-phase fluid.

9. The gas/liquid separation column according to claim 8, in which the upper vertical end of the first pipe is bevelled, wherein an oblique edge of the bevelled upper vertical end is turned away from the peripheral wall, such that the liquid phase, which falls mainly between the upper vertical end of the pipe and the peripheral wall, must travel around said first pipe before then passing down and through the first pipe.

10. The gas/liquid separation column according to claim 8, in which the separation device further comprises a first distribution member in fluid communication with the first pipe, wherein the first distribution member extends across the column along a transverse axis substantially perpendicular to the vertical axis, said first distribution member being configured to distribute the liquid phase of the two-phase fluid over an entire surface of the dispensing device.

11. The gas/liquid separation column according to claim 10, in which the dispensing device comprises at least one perforated plate through which the liquid phase is capable of leaving the dispensing device, a plurality of stacks which emerge from the perforated plate and which are configured to be passed through by gas rising in the column, the stacks being stacked one after the other along the transverse axis perpendicular to the vertical axis, wherein the first distribution member extends mainly along a direction parallel to the transverse axis passing through each stack.

12. The gas/liquid separation column according to claim 11, wherein the first distribution member comprises a plurality of notches along an upper portion of the distribution member and in between the stacks of the dispensing device, such that the distribution member is configured to transfer the liquid phase along the direction parallel to the transverse axis before overflowing the notches and subsequently down to the dispensing device.

13. The gas/liquid separation column according to claim 12, wherein the notches all have substantially equivalent dimensions.

14. The gas/liquid separation column according to claim 12, wherein the notches are sized differently based on their location along the distribution member and the notches are configured to provide a homogenous distribution of the liquid phase over the entire surface of the dispensing device.

15. The gas/liquid separation column according to claim 5, in which the first separation box comprises a splash plate configured to reduce upward flow of the liquid phase into an upper horizontal wall and disturbing a circulation of the gas phase.

16. The gas/liquid separation column according to claim 1, wherein an upper horizontal wall further delimits each of the first and second separation boxes, wherein the upper horizontal wall is arranged between an upper end of the vertical wall and the peripheral wall, wherein the upper horizontal wall is configured to prevent fluid flow through the upper horizontal wall.

17. The gas/liquid separation column according to claim 16, in which the upper horizontal wall extends beyond the vertical wall in a direction of the internal space of the column.

18. The gas/liquid separation column according to claim 1, in which the separation device comprises two distribution members, the two distribution members extending along two mutually parallel directions.

19. The gas/liquid separation column according to claim 1, in which a portion of the duct that is in each of the first and second separation boxes is horizontal and facing the peripheral wall.

20. A distillation assembly comprising a gas/liquid separation column according to claim 1, wherein the gas/liquid separation column is contained in an insulated chamber.

* * * * *